United States Patent

Newby et al.

[11] Patent Number: 5,934,064
[45] Date of Patent: Aug. 10, 1999

[54] PARTIAL OXIDATION POWER PLANT WITH REHEATING AND METHOD THEREOF

[75] Inventors: Richard A. Newby, Pittsburgh; Wen-Ching Yang, Export, both of Pa.; Ronald L. Bannister, Winter Springs, Fla.

[73] Assignee: Siemens Westinghouse Power Corporation, Orlando, Fla.

[21] Appl. No.: 08/855,430

[22] Filed: May 13, 1997

[51] Int. Cl.[6] .................................................. F02C 6/00
[52] U.S. Cl. .................................... 60/39.04; 60/39.17
[58] Field of Search ............................ 60/39.04, 39.12, 60/39.17

[56] References Cited

U.S. PATENT DOCUMENTS

| | | | |
|---|---|---|---|
| 2,511,385 | 6/1950 | Udale | 60/39.04 |
| 2,621,475 | 12/1952 | Loy | 60/39.17 |
| 3,882,671 | 5/1975 | Nebgen . | |
| 4,193,259 | 3/1980 | Muenger et al. . | |
| 4,381,641 | 5/1983 | Madgavkar et al. . | |
| 5,743,081 | 4/1998 | Reynolds | 60/39.17 |

FOREIGN PATENT DOCUMENTS

| | | |
|---|---|---|
| 0 595 026 A1 | 9/1993 | European Pat. Off. . |
| 950 613 | 10/1956 | Germany . |
| 3413241 A1 | 6/1985 | Germany . |
| 8700630 | 10/1988 | Netherlands . |
| 2 191 215 | 12/1987 | United Kingdom . |
| 2 229 733 | 10/1990 | United Kingdom . |
| 2 236 145 | 3/1991 | United Kingdom . |
| WO 91/05946 | 5/1991 | WIPO . |

*Primary Examiner*—Louis J. Casaregola

[57] ABSTRACT

A system and method for generating power having an air compression/partial oxidation system, a turbine, and a primary combustion system. The air compression/partial oxidation system receives a first air stream and a fuel stream and produces a first partially oxidized fuel stream and a first compressed air stream therefrom. The turbine expands the first partially oxidized fuel stream while being cooled by the first compressed air stream to produce a heated air stream. The heated air stream is injected into the expanding first partially oxidized fuel stream, thereby reheating it in the turbine. A second partially oxidized fuel stream is emitted from the turbine. The primary combustion system receives said second partially oxidized fuel stream and a second air stream, combusts said second partially oxidized fuel stream, and produces rotating shaft power and an emission stream therefrom.

12 Claims, 2 Drawing Sheets

PARTIAL OXIDATION POWER PLANT WITH REHEATING AND METHOD THEREOF

STATEMENT OF GOVERNMENT INTEREST

The United States Goverment has rights in this invention pursuant to Contract DE-FG21-95MC32071 with the Department of Energy.

BACKGROUND OF THE INVENTION

This invention relates to staged combustion of fuel and partial oxidation of fuel.

Numerous approaches for improving the thermal performance of combustion turbine power generation systems have been proposed since the early 1950s when combustion turbines were first applied for stationary power generation. Alternative approaches range from advanced topping and bottoming cycles, to advanced turbine firing conditions. Some of these approaches have been put into practice to reach the current level of performance that combustion turbine power generation has evolved to today. The prevalent factor enhancing performance has been increases in firing conditions (temperatures and pressures) through advances in air foil design, materials and cooling methods. Cycle variations are also being developed to improve system performance in contrast to hardware improvements, such as evaporative cooling cycles, recuperative cycles, intercooled cycles, humid air cycles, reheat cycles, advanced bottoming cycles, and elevated steam bottoming conditions.

Many proposed approaches for advanced combustion turbine power cycles have been rejected as being unworkable or uneconomical, and some have not yet been developed sufficiently to be verified, demonstrated and commercialized. Therefore, a need exists for new, viable approaches for improved power generation.

SUMMARY OF THE INVENTION

The claimed invention provides a system and method for generating power having an air compression/partial oxidation system, a turbine, and a primary combustion system. The air compression/partial oxidation system receives a first air stream and a fuel stream and produces a first partially oxidized fuel stream and a first compressed air stream therefrom. The turbine expands the first partially oxidized fuel stream while being cooled by the first compressed air stream to produce a heated air stream. The heated air stream is injected into the expanding first partially oxidized fuel stream, thereby reheating it in the turbine. A second partially oxidized fuel stream is emitted from the turbine. The primary combustion system receives said second partially oxidized fuel stream and a second air stream, combusts said second partially oxidized fuel stream, and produces rotating shaft power and an emission stream therefrom.

DETAILED DESCRIPTION OF THE PREFERRED EMBODIMENTS

Figure 1:
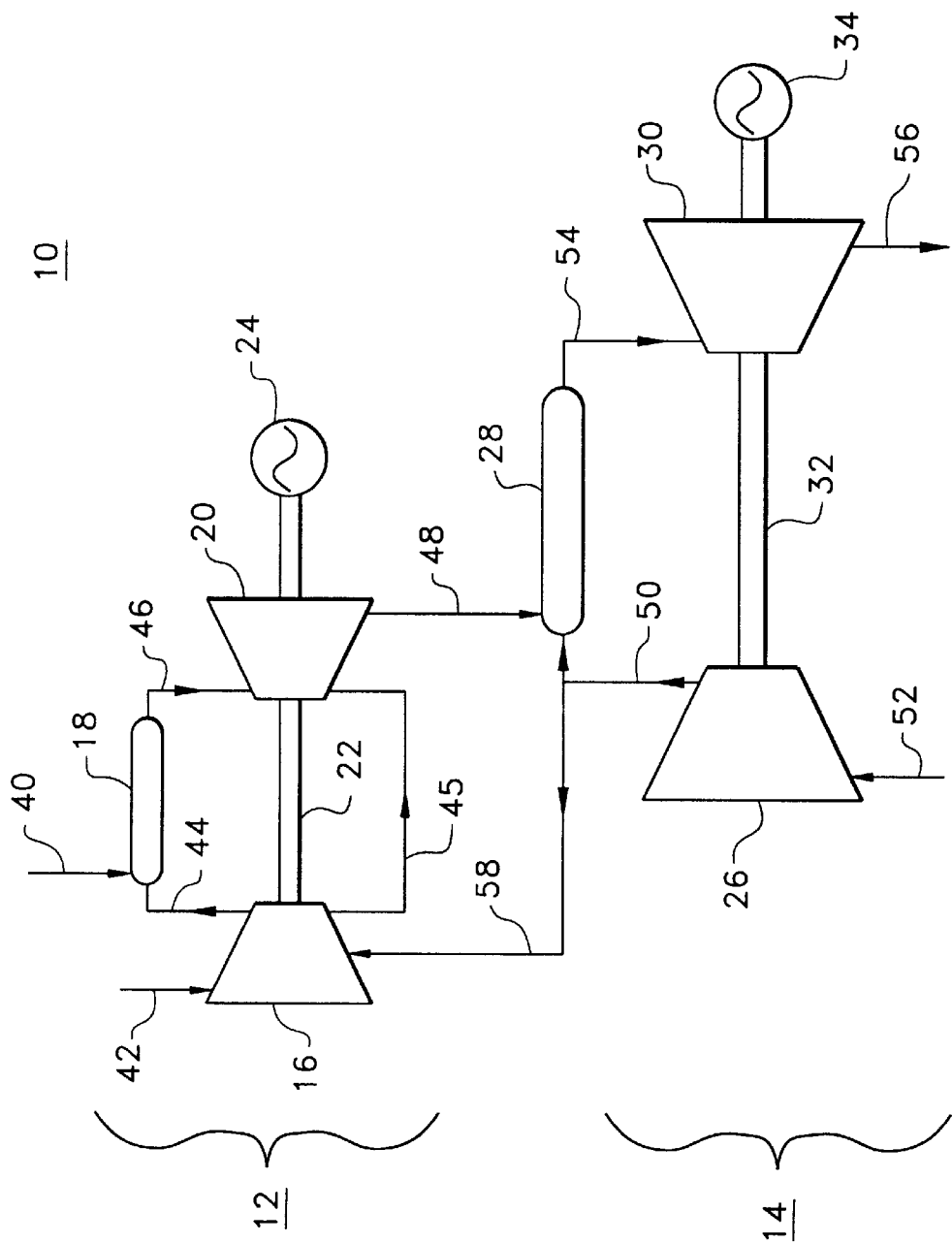
FIG. 1 shows a partial oxidation power plant flow chart having a partial oxidation turbine system with reheating and a primary turbine system.

Now referring to the figures, wherein like reference numerals refer to like elements, and in particular to FIG. 1, a partial oxidation turbine system 12 and a primary turbine system 14 are integrated to form a partial oxidation power plant 10. (It shall be understood that "PO" represents "partial oxidation.") The PO turbine system 12 has a PO air compressor 16, a PO combustor 18 and a PO turbine 20. A shaft 22 extends from the PO turbine 20 to provide rotating shaft power to the PO air compressor 16 and a generator 24 when in operation. Other embodiments of the invention may not have the generator 24 but may place both turbines on a single shaft. The primary turbine system 14 has an air compressor 26, a combustor 28 and a turbine 30. A shaft 32 extends from the turbine 30 to provide rotating shaft power to the air compressor 26 and a generator 34.

In the PO turbine system 12, an air stream 42 and a fuel stream 40 are processed to produce an expanded, partially oxidized fuel stream 48 and rotating shaft power. The air steam 42 is compressed in the PO air compressor 16 to produce first and second compressed air streams 44 and 45. The first compressed air stream 44 is directed into the PO combustor 18 along with the fuel stream 40, where the fuel stream is partially oxidized to produce a partially oxidized fuel stream 46. In the preferred embodiment of the invention, the fuel stream 40 may be partially oxidized by operating the combustor 18 at a substoichiometric condition that achieves a turbine 20 inlet temperature of 1800° F. to 2300° F. The partially oxidized fuel stream 46 is expanded in the PO turbine 20 to produce an expanded, partially oxidized fuel stream 48 and to rotate the shaft 22, thereby providing rotating shaft power to the air compressor 16 and, in the case of excess power, to the PO generator 24 as well.

During the processing of the air stream 42 and the fuel stream 40, the second compressed air stream 45 cools the turbine 20 while reheating the partially oxidized fuel stream 46 passing therethrough, thereby increasing the cycle efficiency. In a preferred embodiment of the invention, the stream 45 may cool the air foils (not shown) of the turbine in an open-loop system as is known in the prior art. Afterwards, the air stream 45 is injected into the turbine flow passage (not shown) and reacts with the expanding, partially oxidized fuel stream 46 to further partially oxidize and reheat it. In a preferred embodiment of the invention, the volume of the compressed air stream 45 and the velocity of the air jets exiting the cooling holes (not shown) are selected to avoid overheating the exterior of the air foils. Further, the reheating increases the efficiency of the cycle and, potentially, reduces $NO_x$ formation.

After exiting the PO turbine system 12, the expanded, partially oxidized fuel stream 48 is combusted in the primary turbine system 14. The expanded, partially oxidized fuel stream 48 is directed into the combustor 28 along with a compressed air stream 50 to produce a combustor emission stream 54. The compressed air stream 50 is produced from an air stream 52 being compressed in the air compressor 26. The turbine 30 expands the combustor emission stream 54 to produce a power plant emission 56 and to rotate the shaft 32, thereby providing rotating shaft power to the generator 34 and the air compressor 26. A preferred embodiment of the invention may have the inlet temperature of the turbine 30 be approximately 1800° F. to 2300° F. for a conventional turbine or inlet temperatures of up to approximately 2600° F. for an advanced turbine, with the turbine 30 being cooled either by open-loop air or closed-loop steam.

The combustion of the fuel stream 40 in two stages, first in the PO turbine system 12 and then in the primary turbine system 14, increases the net cycle efficiency. Some embodiments of the invention may use a compressed air bleed 58 to direct a portion of the compressed air stream 50 to the air compressor 16 of the PO turbine system 12 to increase the cycle efficiency.

Figure 2:
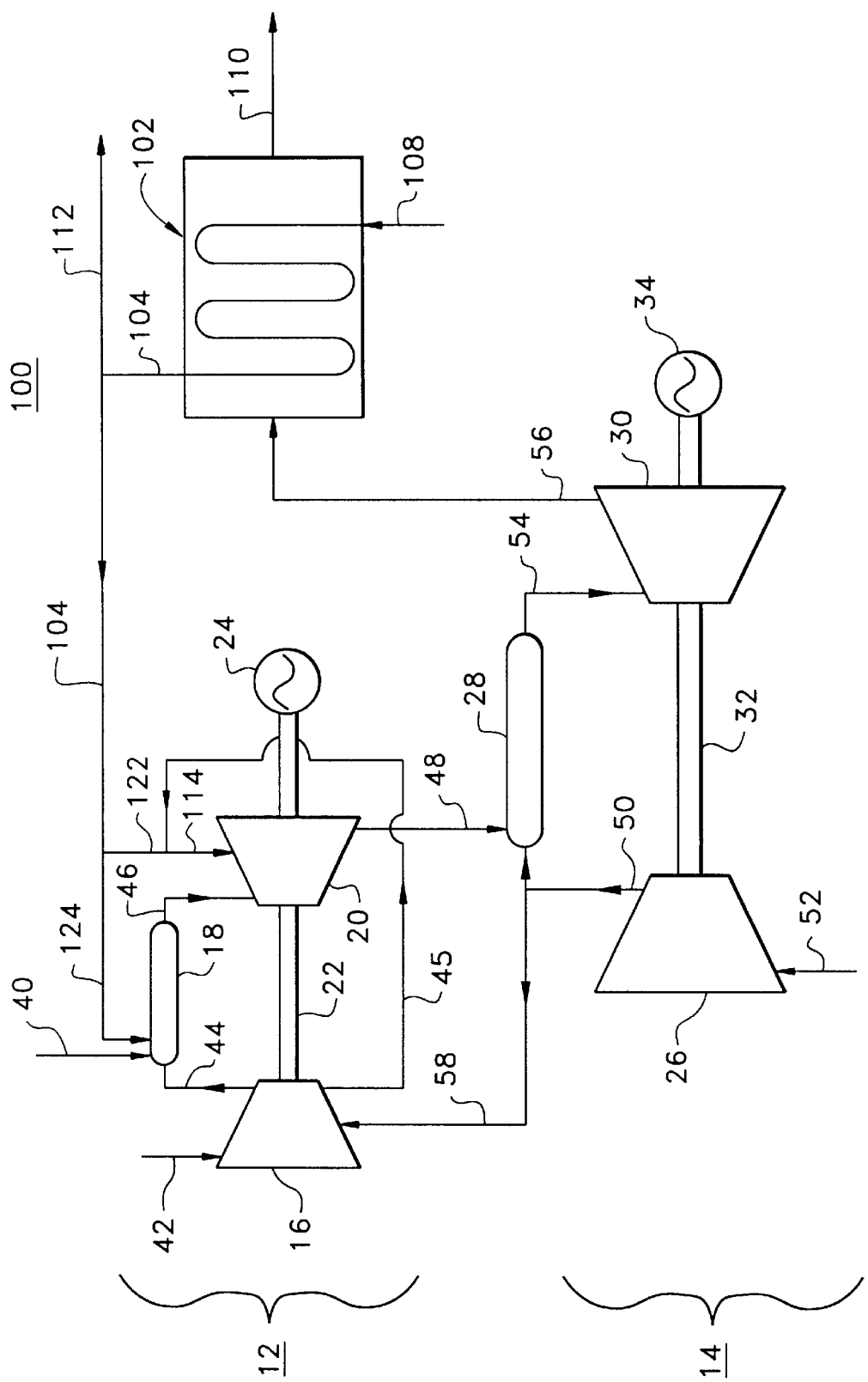
FIG. 2 shows the partial oxidation power plant flow chart of FIG. 1 incorporating a steam generation system to provide steam to the partial oxidation turbine system.

Now referring to FIG. 2, a partial oxidation power plant 100 comprises the PO turbine system 12 and the primary turbine 14 along with a steam generation system 102 for generating a steam flow 104 from the energy content of the power plant emission 56. The steam flow 104 is used in the PO combustor 18 and the PO turbine 20. In the embodiment of the invention shown in FIG. 2, the steam generation system 102 is a heat recovery steam generator that provides a super-heated steam 104 from a water stream 108. The steam generation system discharges the energy-reduced power plant emission 56 as system exhaust 110. Other embodiments of the invention may use other suitable and equivalent steam generation systems, including an evaporator/economizer system, that generates steam with relatively less energy content.

In the embodiment of the invention of FIG. 2, the steam flow 104 is split into the first portion 122 and a second portion 124. The first steam flow portion 122 is directed to the PO turbine 20 to help in cooling it. The second steam flow portion 124 is directed to the PO combustor 18 to reduce the possible formation of soot particles and to lower the flame temperature in the combustor and, as a result, the generation of $NO_x$. Other embodiments of the invention may have other uses for the steam flow 104, including directing excess steam flow 112 from the steam flow 104 to a bottoming cycle (not shown) or for co-generation uses of process steam.

In a preferred embodiment of the invention, the steam flow first portion 122 is mixed with the second compressed air stream 45 prior to entering the turbine 20 as an air-steam mixture 114. The air-steam mixture 114 cooling the vanes, shroud, and blades on each stage by conventional cooling arrangements, and is then injected into the turbine flow passage to react with and reheat the expanding partially oxidized fuel stream 46 (not shown). The quantity of the compressed air 45, the steam-to-air ratio, and the velocity of the air jets exiting the cooling holes of the turbine are selected to avoid overheating the exterior of the air foils. The extent of the reheat is controlled by the air-steam ratio in the mixture 114.

Other embodiments of the invention may have steam cooling of the latter stages of the PO turbine 20 to maintain the low-BTU fuel gas value of fuel stream 46 high enough so that sufficiently high temperature, with acceptable CO, can be achieved in the combustor 28 of the primary turbine system 14. Still other embodiments of the invention may have the steam flow first portion 122 enter the turbine 20 separately from the second compressed air stream 45.

The result of providing cooling and reheating to the PO turbine 20 is to further increase the cycle efficiency of an already efficient two stage system. As the two stage combustion requires lower cooling requirements for the turbines, cycle efficiency increases through reduced compressed air demand. A two stage system, such as power plant 10, has reduced $NO_x$ emissions compared to a one stage power plant. The two stage power plant 100 has further reduced $NO_x$ emissions compared to a one stage power plant because of the lower combustion temperature in the PO combustor 18 due to steam injection and the two stage combustion process.

An equivalent to having two separate turbine systems on two shafts is to have the systems on one shaft, with appropriate power and speed transmission means therebetween. Another equivalent is to have only one air compressor supply compressed air to both combustors. The invention may be practiced with fuel other than natural gas. Additionally, the invention may be practiced with more than one PO turbine system, either arranged in series, parallel, or a combination thereof, producing partially oxidizing fuel streams for the primary turbine system. Further, the invention may be practiced with any suitable partial oxidation turbine system and any suitable primary turbine system. Other embodiments of both power plants 10 and 100 may include additional optimizations to improve cycle efficiency. Consequently, the present invention may be embodied in other specific forms without departing from the spirit or essential attributes thereof and, accordingly, reference should be made to the appended claims, rather than to the foregoing specification, as indicating the scope of the invention.

We claim:

1. A power generation system comprising:
    a) a first turbine system comprising:
        i) a partial oxidation air compressor with an air inlet and a first and second compressed air outlet;
        ii) a partial oxidation combustor with a compressed air inlet, a fuel inlet, and a partially oxidized fuel outlet;
        iii) a partial oxidation turbine with a plurality of inlets including a partially oxidized fuel inlet connected to said partially oxidized fuel outlet, and a compressed air inlet, and an expanded partially oxidized fuel outlet;
        iv) delivery means for delivering first and second portions of a compressed air stream produced in said partial oxidation air compressor to said compressed air inlets of said partial oxidation combustor and said partial oxidation turbine, respectively; and
        v) first shaft extending through said partial oxidation turbine for producing rotating shaft power;
    b) a second turbine system comprising:
        i) a primary air compressor with an air inlet and a compressed air outlet;
        ii) a primary combustor with a compressed air inlet connected to said primary air compressor compressed air outlet, a partially oxidized fuel inlet connected to said expanded partially oxidized fuel outlet, and a primary combustor emission outlet;
        iii) a primary turbine with a primary combustor emission inlet connected to said primary combustor emission outlet, and a primary turbine outlet; and
        iv) second shaft extending through said primary turbine for producing rotating shaft power; and
    c) a steam generator comprising:
        i) a water inlet;
        ii) a primary turbine emission inlet connected to the primary turbine outlet;
        iii) a steam outlet; and
        iv) a system exhaust outlet;
    where said partial oxidation turbine also has a steam inlet connected to said steam generator steam outlet, where steam functions as a coolant for the partial oxidation turbine.

2. The power generation system of claim 1, wherein said partial oxidation air compressor has a compressed air inlet connected to said primary air compressor compressed air outlet.

3. The power generation system of claim 1, wherein said partial oxidation combustor has a steam inlet connected to said steam generator steam outlet.

4. The power generation system of claim 1, wherein said partial oxidation turbine compressed air inlet is connected to said steam generator steam outlet.

5. The power generation system of claim 4, wherein said partial oxidation combustor has a steam inlet connected to said steam generator steam outlet.

6. A method for generating power comprising the steps of:
a) compressing a first air stream to produce a first and second compressed air stream;
b) partially oxidizing a fuel stream in the first compressed air stream to produce a partially oxidized fuel stream;
c) directing said partially oxidized fuel stream through a first turbine to produce an expanded partially oxidized fuel stream, said first turbine having first shaft extending therethrough for producing rotating shaft power;
d) directing the second compressed air stream to said first turbine;
e) compressing a second air stream to produce a third compressed air stream;
f) combusting said expanded partially oxidized fuel stream in at least a first portion of said third compressed air stream to produce combustion emission; and
g) expanding said combustion emission in a second turbine to produce a second turbine emission stream, said second turbine having second shaft extending therethrough for producing rotating shaft power;
h) directing said second turbine emission stream to a steam generator having a water inlet and a steam outlet, to generate steam;
i) directing said steam to said first turbine; where said second compressed air stream and said steam cool said first turbine.

7. The method of claim 6, further comprising the step of transferring energy from said second turbine emission stream to a water stream to produce a steam flow.

8. The method of claim 7, further comprising the step of cooling said first turbine with a portion of said steam flow.

9. The method of claim 7, wherein said partially oxidizing step further comprises the steps of partially oxidizing said fuel stream in a partial oxidization combustor and injecting a portion of said steam flow therein.

10. The power generation system of claim 1, wherein the connection between the steam inlet of the partial oxidation turbine and the steam generator steam outlet is a delivery means for delivering the steam produced in the steam generator to the compressed air inlet of the partial oxidation turbine such that the steam from the steam generator and the second portion of compressed air from the partial oxidation air compressor will mix, where the mixture of steam and compressed air helps cool the partial oxidation turbine.

11. The method of claim 6, where in step d) a heated air stream is produced which mixes with said partially oxidized fuel stream to reheat the partially oxidized fuel stream to enable further partial oxidation.

12. The method of claim 6, where steam from the steam generator and the second compressed air stream are mixed together before entry into the first turbine, where the mixture of steam and compressed air helps cool the first turbine.

* * * * *